United States Patent Office 3,267,097
Patented August 16, 1966

3,267,097
HALOCARBONIC AND ARYL FORMAMIDINES AND PROCESS FOR THEIR PRODUCTION
Engelbert Kühle and Ludwig Eue, Cologne-Stammheim, Germany, assignors to Farbenfabriken Bayer Aktiengesellschaft, Leverkusen, Germany, a corporation of Germany
No Drawing. Filed Mar. 25, 1965, Ser. No. 442,771
12 Claims. (Cl. 260—247.2)

The present invention is a continuation-in-part of applications, Serial No. 28,555, filed May 12, 1960, now abandoned, and Serial No. 213,592, filed July 31, 1962.

The present invention relates to new and useful herbicidal compounds and process for their production. Generally the new compounds of this invention may be represented by a general formula

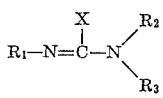

wherein $R_1$ represents an aromatic or heterocyclic radical optionally substituted in the nucleus by halo, alkyl, alkoxy and/or nitro groups or a further

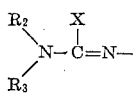

group. Aryl groups such as phenyl or substituted phenyl are found particularly useful in the present invention. X is a halo moiety, more specifically chloro or bromo or fluoro; $R_2$ and $R_3$ may be hydrogen, lower alkyl, aryl, or heterocyclic radicals; in addition, $R_2$ and $R_3$ can also be combined with the nitrogen atom to form a 5- or 6-membered ring system which may be optionally interrupted by further hetero atoms. The above useful compounds may be obtained in good yield by reacting the corresponding aryl-isocyanide-di-halides with suitable amine reactants in accordance with the following reaction scheme:

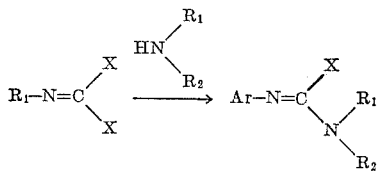

wherein the groups are defined as above.

The reaction is exothermic and proceeds smoothly at room temperature or below, the preferred maximum temperature being about 20° C. It is also preferred to effect the reaction in an inert organic solvent or organic solvent by treating the aryliso-cyanide dihalide with about 2 mols of an amine, one mol of the amine being used as a salt-former. However, it is also possible to work in an aqueous phase and in this case the hydrogen halide set free by the reaction may also be bonded with inorganic bases or tertiary amines.

Suitable arylisocyanide dihalides include, for example, phenylisocyanide dichloride, the dibromide or difluoride, p-chlorophenylisocyanide dichloride, 3,4-dichlorophenylisocyanide dichloride, p-tolylisocyanide dichloride, p-fluorophenylisocyanide dichloride, p-methoxyphenylisocyanide dichloride, p-nitrophenylisocyanide dichloride or also naphthylisocyanide dichloride.

For purposes of the reacton the amine component may include amonia as well as primary or secondary aliphatic, aromatic or heterocyclic amines.

The compounds obtainable according to the invention may be used as intermediate products for further syntheses. Moreover, they are usitable as plant protective agents, and especially as herbicides. In the latter respect they are used in the same way and by the same methods as well as in the same quantities about as known p-chloro-phenyl-dimethyl urea (CMU) is used in regard to the above utility.

The compounds of the present invention are useful as universal weed control agents, especially in the control of weed on railway lines and outside industrial plants. The compounds may be applied in the form of dust in combination with borax, quartz sand, pumic grit or similar materials. The compounds of the present invention are applied in quantities between 7.5 to 30 kg./ha., depending on the height and dense occurrence of the weed to be controlled.

The following examples are given for the purpose of illustrating the present invention:

Example 1

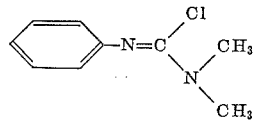

34.8 grams of phenylisocyanide dichloride are dissolved in 150 ml. of benzene and treated with a total of 18 grams of dimethylamine while cooling with ice-water. The temperature should not exceed 20° C. The mixture is stirred for some time, the dimethylamine hydrochloride filtered off with suction, the solvent distilled off, and 35 grams of a yellowish oil are thus obtained which upon distillation in a vacuum boils at 131–133° C./12 mm. Hg.

By the same way there may be obtained the following compound:

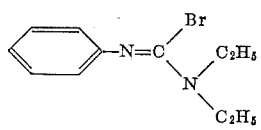

Example 2

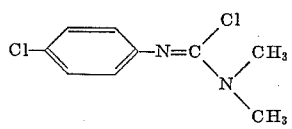

31.5 grams of p-chlorophenylisocyanide dichloride are dissolved in 130 ml. of benzene and treated with 13.8 grams of dimethylamine while cooling with ice-water. After completion of the reaction, the dimethylamine hydrochloride is filtered off with suction and, after evaporation of the solvent, 33 grams of p-chlorophenylamino-chlorocarbonic acid dimethyl amide of B.P. 157–160° C./10 mm. Hg are thus obtained.

By the same way there may be obtained the following compounds:

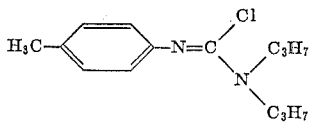

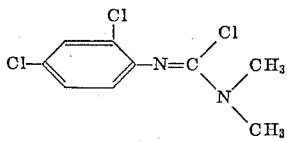

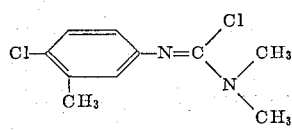

*Example 3*

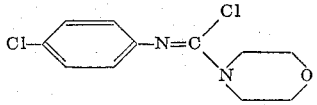

20.8 grams of p-chlorophenylisocyanide-dichloride are dissolved in 200 ml. of benzene and treated dropwise with a solution of 17.4 grams of morpholine and 50 ml. of benzene at a temperature of 15–20° C. After the reaction is finished it is filtered off with suction from morpholine chlorohydrate, the solvent is distilled off and the residue is distilled in vacuum. There are obtained 25 grams of p-chlorophenylimino-chlorocarbonic acid morpholide of B.P.$_{15}$: 210–212° C., M.P. 85° C.

By the same way there may be obtained the following compounds:

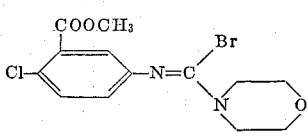

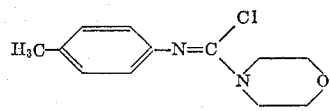

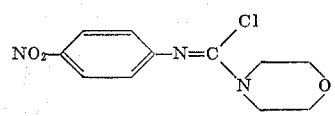

*Example 4*

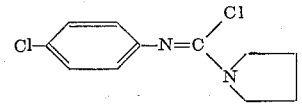

41.6 grams of p-chlorophenylisocyanide-dichloride are dissolved in 250 ml. of benzene and treated dropwise with a solution of 28.4 grams of pyrolidine and 50 ml. of benzene at 15–20° C. After stirring for some time the pyrolidine-chlorohydrate is filtered off with suction, the filtrate is distilled off in vacuum. There are obtained 15 grams of p-chlorophenylimino-chlorocarbonic acid-pyrolidide of B.P.$_{15}$: 202–207° C.

By the same way there may be obtained the following compounds:

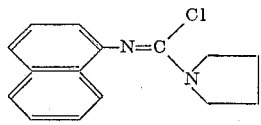

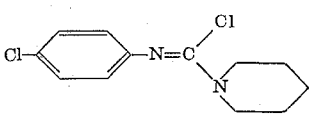

*Example 5*

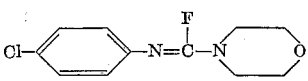

To a solution of 17.5 g. of 4-chlorophenyl-isocyanide difluoride in 150 cc. of benzene there are added dropwise at a temperature below 20° C., 18 g. of morpholine dissolved in 100 cc. of benzene, the mixture is then further stirred for some time, the precipitated morpholine hydrofluoride filtered off with suction and the filtrate concentrated in a vacuum. In this way there are 24 g. of the fluoroformamidine derivative of the formula given above of B.P. 193 to 194° C. at mm. Hg and M.P. 66 to 69° C.

In the same manner there may be produced the following compounds:

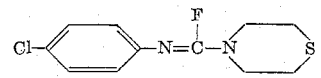

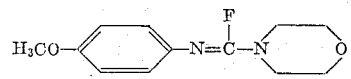

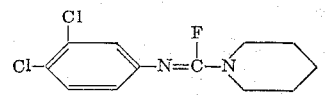

We claim:
1. A compound of the formula

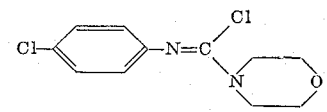

2. The compound of the formula

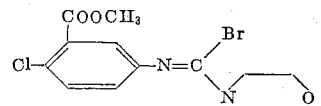

3. The compound of the formula

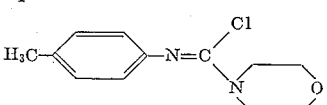

4. The compound of the formula

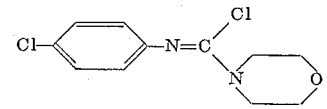

5. The compound of the formula

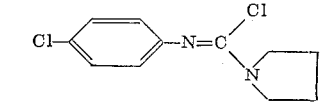

6. The compound of the formula

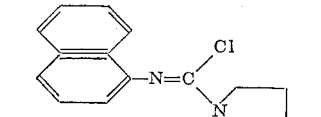

7. The compound of the formula

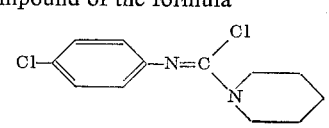

8. The compound of the formula

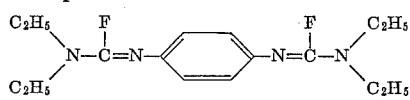

9. The compound of the formula

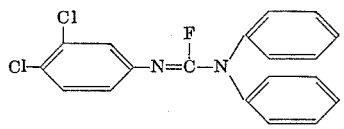

10. An arylimino-halocarbonic acid amide of the formula

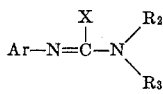

wherein Ar is naphthyl, X stands for a member selected from the group consisting of chloro and bromo; $R_3$ and $R_2$ are hyrogen, and, when defined together in combination with the nitrogen atom are a member selected from the group consisting of morpholino, thiomorpholino and pyrrolidino.

11. A process of claim 12 wherein the reaction is effected in the presence of an inert organic reaction solvent.

12. A process for producing a halo carbonic acid amide of the formula

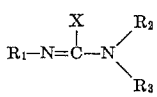

comprising contacting an isocyanide dihalide of the formula

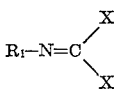

with about a molar amount of an amine of the formula $$R_2\text{---}NH\text{---}R_3$$

at a temperature not exceeding about 20° C. and in the presence of an acid binding agent, wherein $R_1$ is defined as a member selected from the group consisting of a phenyl, and a naphthyl and additionally defined as

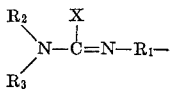

X is defined as halo; and $R_2$ and $R_3$ are members selected from the group consisting of hydrogen, lower alkyl, and aryl, and in combination with the N atom are further defined as morpholino, thiomorpholino, and pyrrolidino.

References Cited by the Examiner

UNITED STATES PATENTS 3,084,192   4/1963   Smathers _____ 260—564

OTHER REFERENCES

Conant et al.: "The Chemistry of Organic Compounds," 4th edition, p. 549 (1956).

Dyson et al., "Chemical Society Journal," pages 150–153 (1942).

HENRY R. JILES, *Acting Primary Examiner.*

JOSE TOVAR, *Assistant Examiner.*